(12) United States Patent
Yen

(10) Patent No.: US 8,280,938 B2
(45) Date of Patent: Oct. 2, 2012

(54) SEMI-SEQUENTIAL GALOIS FIELD MULTIPLIER AND THE METHOD FOR PERFORMING THE SAME

(75) Inventor: Chih-Hsu Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 947 days.

(21) Appl. No.: 12/346,787

(22) Filed: Dec. 30, 2008

(65) Prior Publication Data
US 2010/0115017 A1    May 6, 2010

(30) Foreign Application Priority Data
Oct. 30, 2008 (TW) .............................. 97141800 A

(51) Int. Cl.
*G06F 17/10* (2006.01)
(52) U.S. Cl. ........................................ 708/492; 708/491
(58) Field of Classification Search .................. 708/491, 708/492
See application file for complete search history.

(56) References Cited

U.S. PATENT DOCUMENTS

| | | | |
|---|---|---|---|
| 4,251,875 A | 2/1981 | Marver et al. | |
| 5,999,959 A * | 12/1999 | Weng et al. | 708/492 |
| 6,779,011 B2 * | 8/2004 | Weng et al. | 708/492 |
| 6,957,243 B2 | 10/2005 | Chen | |
| 7,010,738 B2 * | 3/2006 | Morioka et al. | 714/752 |
| 7,113,968 B1 | 9/2006 | Ireland et al. | |
| 7,133,889 B2 | 11/2006 | Parthasarathy et al. | |
| 7,136,892 B2 | 11/2006 | Feuser | |
| 7,343,472 B2 * | 3/2008 | Porten et al. | 712/208 |
| 7,403,964 B2 | 7/2008 | Porten et al. | |
| 7,519,644 B2 * | 4/2009 | Al-Khoraidly et al. | 708/492 |
| 2006/0080377 A1 * | 4/2006 | Chien | 708/492 |

FOREIGN PATENT DOCUMENTS

TW    I253011    4/2006

OTHER PUBLICATIONS

"A Novel Architecture for Galois Fields (GF(2m) Multipliers Based on Mastrovito Scheme," by Nicola Petra et al., vol. 56, No. 11, Nov. 2007.*
Taiwan Patent Office, Notice of Allowance, Patent Application Serial. No. 097141800, Jun. 28, 2012, Taiwan.

* cited by examiner

*Primary Examiner* — Tammara Peyton
(74) *Attorney, Agent, or Firm* — Lin & Associates IP, Inc.

(57) ABSTRACT

Disclosed are a semi-sequential Galois field $GF(2^n)$ multiplier and the method thereof. The $GF(2^n)$ multiplier comprises two ground field multipliers over $GF(2^m)$, at least a constant multiplier, and multiple $GF(2^m)$ adders. The high-order and low-order elements from a composite field $GF((2^m)^2)$ for one operand of one $GF(2^n)$ multiplication are inputted in parallel into the two ground $GF(2^m)$ multipliers, respectively. The high-order and low-order elements from the composite field of another operand of the $GF(2^n)$ multiplication are sequentially inputted into the two ground $GF(2^m)$ multipliers. As such, multiple partial products are generated. The constant multiplication and additions are performed on the multiple partial products through the constant multiplier and the $GF(2^m)$ adders. This generates a high-order element and a low-order element of the composite field $GF((2^m)^2)$. After mapping these two elements of $GF((2^m)^2)$ back to $GF(2^n)$, the $GF(2^n)$ multiplication is done.

6 Claims, 8 Drawing Sheets

| $B_0$ | $B_1$ | ... | $B_n$ |
|---|---|---|---|
| $A_0 A_1 A_2 ... A_j$ | $A_{j+1} A_{j+2} A_{j+3} ... A_k$ | ... | $A_{m+1} A_{m+2} A_{m+3} ... A_1$ |

SEMI-SEQUENTIAL GALOIS FIELD MULTIPLIER AND THE METHOD FOR PERFORMING THE SAME

FIELD OF THE INVENTION

The present invention generally relates to a semi-sequential Galois Field multiplier and the method for performing the same.

BACKGROUND OF THE INVENTION

Galois Counter Mode-Advanced Encryption Standard (GCM-AES) is widely applied to the IPsec environment. The second layer security standard MACsec of Ethernet also uses GCM-AES algorithm as the default encryption/decryption. GCM-AES algorithm uses Galois Field $GF(2^{128})$ multiplication to realize the hash function, resulting in the increase of the hardware cost of GCM-AES in hardware implementation. The hardware cost of a single $GF(2^{128})$ multiplier is near the cost of a 128-bit AES core engine. When integrating the MACsec controller having GCM-AES to the Ethernet MAC controller, the cost ratio affected by GCM-AES will be even higher.

$GF(2^n)$ is a finite field, a space defined by an n-order primitive polynomial, with $2^n$ elements. Each element is n-bit, and n bits are the coefficients of the polynomial of the corresponding element:

$$b_0 + b_1 x + \ldots + b_{n-1} x^{n-1}$$

where $b_i$ is an element in GF(2), either 0 or 1. Assume that the primitive polynomial constructing the $GF(2^n)$ space is g(x), the multiplication of $GF(2^n)$ elements may be seen as two steps: first, two elements go through a general polynomial multiplication; then, the obtained polynomial in the first step is divided by g(x) to obtain the remainder. The addition of $GF(2^n)$ elements is logically the same as the n-bit XOR operation.

When n is a large positive integer, such as 128, the $GF(2^n)$ multiplication is an expensive computation. Therefore, a composite field is used to reduce the computation complexity. The mathematic expression for composite field is $GF((2^m)^k)$, where k*m=n, and both m and k are positive integers. In terms of the number of bits of elements, the composite field is to translate an n-bit element in $GF(2^n)$ to k m-bit elements in $GF(2^m)$. Because k*m=n, the entire result is still an n-bit value. In the composite field, $GF(2^m)$ is called a ground field. To map an element from $GF(2^n)$ to $GF((2^m)^k)$, three polynomials are required, including g(x) required to construct $GF(2^n)$, an m-order primitive polynomial p(x) and a k-order primitive polynomial r(x), where the coefficients of p(x) belong to GF(2), and the coefficients of r(x) belong to $GF(2^m)$.

Then, by using the theory proposed by Christof Paar, an n×n matrix M may be found to map elements from $GF(2^n)$ to $GF((2^m)^k)$. The inverse matrix $M^{-1}$ will map the elements from $GF((2^m)^k)$ to $GF(2^n)$. In the polynomial representation, A element in $GF(2^n)$ is represented as:

$$A(x) = a_0 + a_1 x + \ldots + a_{n-1} x^{n-1}\ a_i \in GF(2)$$

After being mapped to composite field $GF((2^m)^k)$, A may be represented by:

$$A(x) = a_0 + a_1 x\ a_i \in GF(2)$$

The composite field multiplication is the same as the aforementioned two steps, first, a general polynomial multiplication followed by obtaining of a remainder.

There are numerous disclosed techniques for Galois Field multipliers (GF multiplier). For example, U.S. Pat. No. 4,251,875 disclosed a generic GF multiplier architecture. By using a single $GF(2^m)$ multiplier architecture, the two operands are sequentially inputted to complete the $GF(2^n)$ multiplication, where m is a multiple of n. U.S. Pat. No. 7,113,968 disclosed a GF multiplier architecture using a polynomial and two operations of polynomial modulo.

U.S. Pat. No. 7,133,889 disclosed a GF multiplier architecture, as shown in FIG. 1, using a single ground field $GF(2^m)$ multiplier architecture and using Karatsuba-Ofman computation for multiplication. U.S. Pat. No. 6,957,243 disclosed a GF multiplier architecture using polynomial factoring approach, by inputting an operand A(x) sequentially, i.e., $A_0(x), A_1(x), \ldots, A_{T-1}(x)$ sequentially, and inputting another operand b(x) in parallel, to perform multiplication, as shown in FIG. 2.

In recent years, $GF(2^n)$ is widely applied to error-control code (ECC) and encryption, such as Reed-Solomon, Cyclic Code in ECC, and Ellipse curve encryption system, AES, and GCM in encryption. Hence, it is imperative to devise a GF multiplier hardware architecture to reduce the GCM-AES cost, maintain Gigabit processing power and suit the network communication environment.

SUMMARY OF THE INVENTION

The disclosed exemplary embodiments of the present invention may provide a semi-sequential GF multiplier and the method for performing the same.

In an exemplary embodiment, the disclosed is directed to a semi-sequential GF multiplier for executing the multiplication of two operands of $GF(2^n)$, where n is a positive even number. The $GF(2^n)$ multiplier may comprise two single ground field $GF(2^m)$ multipliers, at least a constant multiplier, and a plurality of single $GF(2^m)$ adders, where n=2m, n and m are both positive integers. The high-order and the low-order elements of the composite field of one operand of $GF(2^n)$ multiplication are inputted in parallel to the two single ground field $GF(2^m)$ multipliers, while the high-order and the low-order elements of the composite field of the other operand of $GF(2^n)$ multiplication are inputted sequentially to the two single ground field $GF(2^m)$ multipliers, and a plurality of partial products of $GF(2^m)$ are generated. Then, the partial products of $GF(2^m)$ generate a high-order and a low-order elements of the $GF(2^n)$ product through the constant multiplier and the plurality of single $GF(2^m)$ adders. The high-order and the low-order elements of the $GF(2^n)$ product are mapped back to $GF(2^n)$ to accomplish the $GF(2^n)$ multiplication.

In another exemplary embodiment, the disclosed is directed to a semi-sequential data input method for GF multiplication, comprising: mapping the two operands of $GF(2^n)$ multiplication from $GF(2^n)$ to $GF((2^m)^2)$ to obtain composite field elements; and inputting the high-order and the low-order elements of the composite field of one operand of $GF(2^n)$ multiplication in parallel to two single ground field $GF(2^m)$ multipliers, while inputting the high-order and the low-order elements of the composite field of the other operand of $GF(2^n)$ multiplication sequentially to the two single ground field $GF(2^m)$ multipliers.

Yet in another exemplary embodiment, the disclosed is directed to a method for executing semi-sequential GF multiplication, comprising: mapping the two operands of $GF(2^n)$ multiplication from $GF(2^n)$ to $GF((2^m)^2)$ to obtain composite field elements, where the high-order and the low-order elements of the composite field of one operand of $GF(2^n)$ multiplication being inputted in parallel to two single ground field $GF(2^m)$ multipliers, while the high-order and the low-order elements of the composite field of the other operand of $GF(2^n)$ multiplication are inputted sequentially to the two single ground field $GF(2^m)$ multipliers; dividing the $GF(2^n)$ multiplication into a plurality of $GF(2^m)$ partial products; and using the two ground field $GF(2^m)$ multipliers, at least a constant multiplier and a plurality of $GF(2^m)$ adders to execute the plurality of $GF(2^m)$ partial products and generate a high-order element and a low-order element of the product.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 6 shows a scenario when one operand of GF multiplication is a low frequency variable, consistent with certain disclosed embodiments of the present invention.

DETAILED DESCRIPTION OF THE PREFERRED EMBODIMENTS

The present invention targets the situation where one operand of the $GF(2^n)$ multiplication is a low frequency variable and the other operand is a high frequency variable. The low frequency variable is inputted in parallel, and the high frequency variable is inputted sequentially. The $GF((2^m)^2)$ composite field form is used to realize a $GF(2^n)$ multiplier, where the $GF(2^n)$ primitive polynomial is $g(x)$ and $GF(2^m)$ primitive polynomial is $p(x)$. The low frequency variable is similar to the GHASH computation in GCM mode, where the H value involved in the GF multiplication depends on the secret key K, and the update frequency of key K is low in actual application environment. The H value is the value obtained through the encryption algorithm using key K to encrypt an all-zero data block, is also one of the three inputs to the GHASH computation, and n is a positive even integer.

The disclosed exemplary embodiments uses the polynomial $r(x)=r_0+x+x^2$ as the example to form the $GF((2^m)^2)$ space, where $r_0$ is an element in $GF(2^m)$, and makes $r(x)$ satisfy the primitivity in $GF(2^m)$. Assume that A and B are both elements of $GF(2^n)$, after being mapped to $GF((2^m)^2)$ space, the polynomial representations are $a_0+a_1x$ and $b_0+b_1x$, respectively, where $\{a_0, a_1, b_0, b_1\} \in GF(2^m)$ and $b_1$ is the coefficient of x. In other words, $b_1$ is the high-order $GF(2^m)$ element in $GF((2^m)^2)$, and $b_0$ is the low-order element. The relation between high-order $a_1$ and low-order $a_0$ is also similar. The multiplication may be expressed as:

$$A \times B = (a_0 + a_1 x)(b_0 + b_1 x) \bmod r(x)$$
$$= a_0 b_0 + (a_1 b_0 + a_0 b_1)x + a_1 b_1 x^2 \bmod r(x)$$
$$= (a_0 b_0 + a_1 b_1 r_0) + (a_1 b_0 + a_1 b_1 + a_0 b_1)x$$

where the value of $a_1b_0+a_1b_1+a_0b_1$ is the high-order element in the product, and the value of $a_0b_0+a_1b_1r_0$ is the low-order element in the product.

Figure 1:
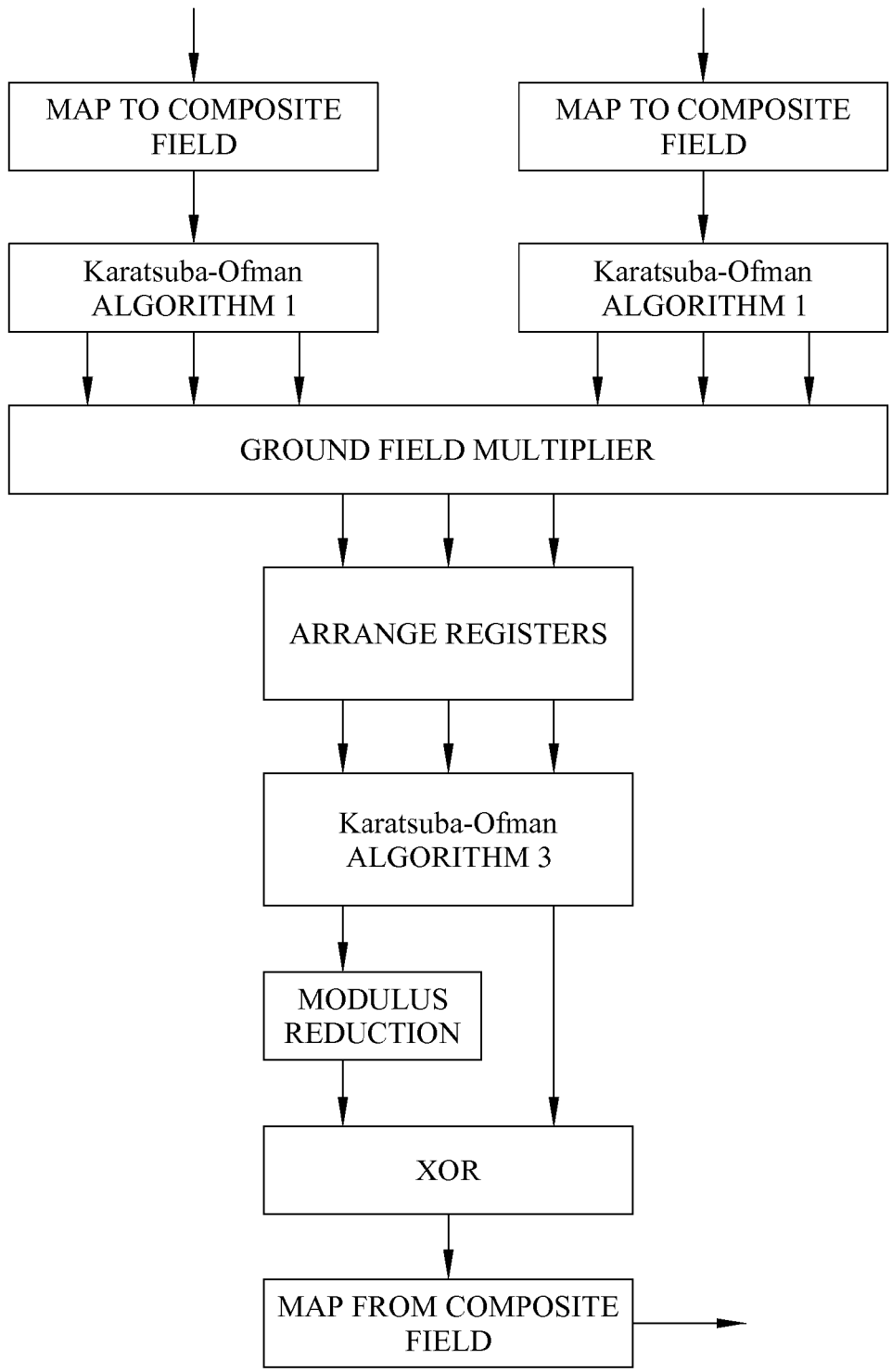
FIG. 1 shows an exemplary schematic view of a conventional GF multiplier.
Figure 2:
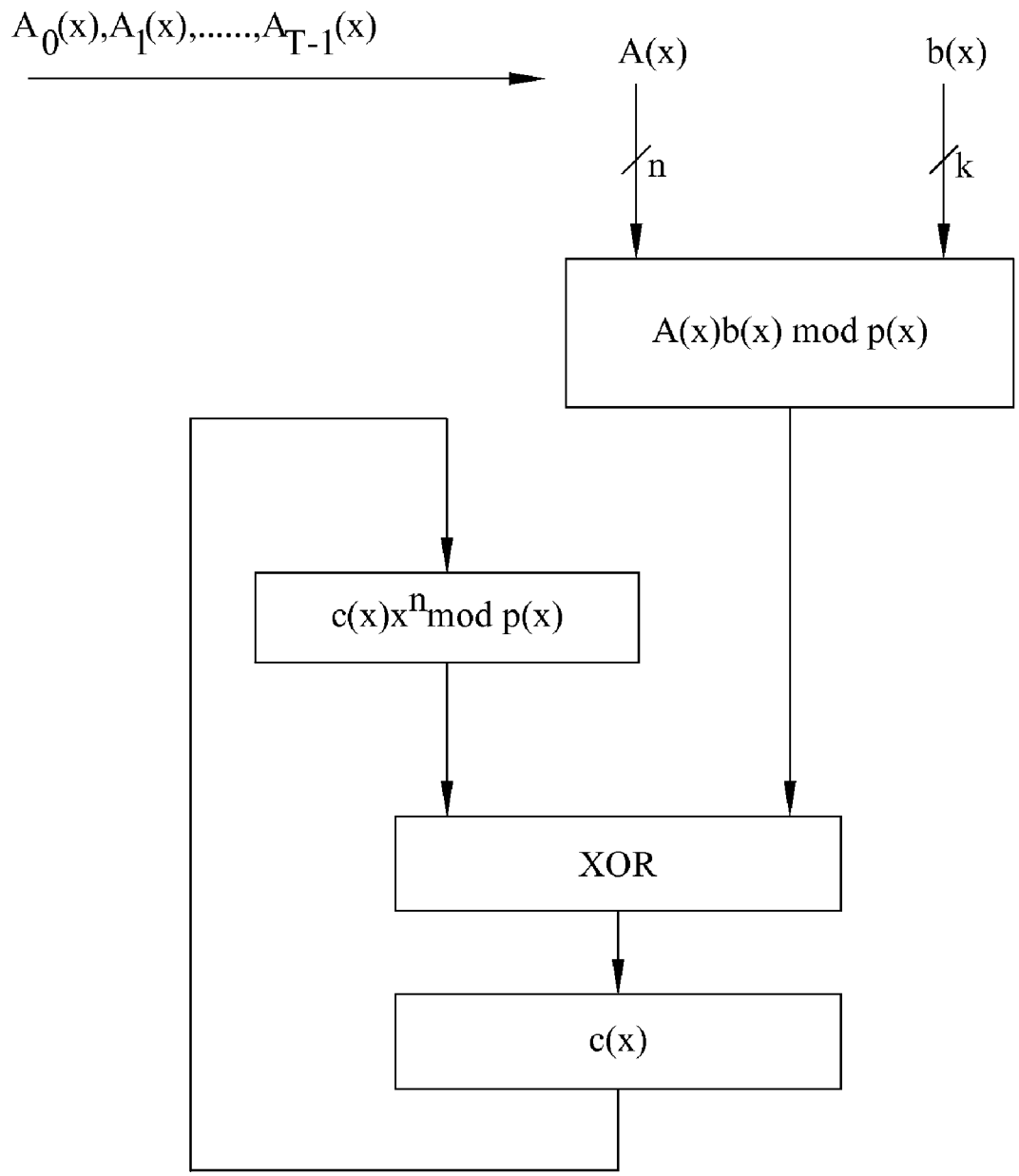
FIG. 2 shows an exemplary schematic view of another conventional GF multiplier.
Figure 3:
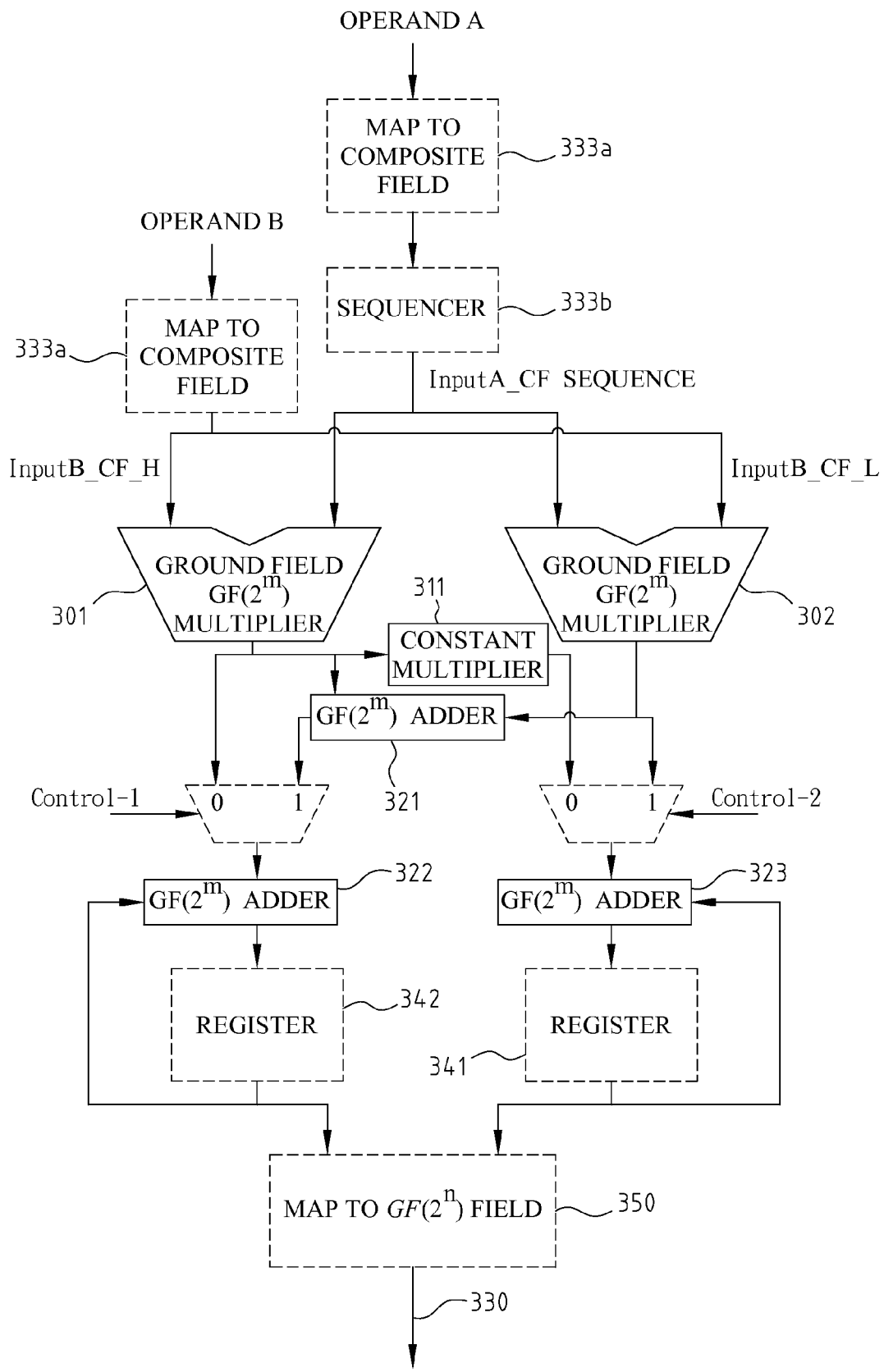
FIG. 3 shows an exemplary schematic view of a semi-sequential GF multiplier, consistent with certain disclosed embodiments of the present invention.

FIG. 3 shows an exemplary schematic view of a semi-sequential GF multiplier, consistent with certain disclosed embodiments of the present invention. Referring to FIG. 3, the hardware implementation of GF multiplier architecture executes the multiplication of the two operands, i.e., A and B, in $GF(2^n)$ to generate a product 330. As may be seen from FIG. 3, the GF multiplier architecture may use two single ground field $GF(2^m)$ multipliers 301, 302, at least a constant multiplier 311, and a plurality of single $GF(2^m)$ adders 321-323, to realize the $GF(2^n)$ multiplication, where n=2m.

The high-order element and low-order element of composite field $GF((2^m)^2)$ of operand B are inputted in parallel to ground field $GF(2^m)$ multipliers 301, 302, and the high-order element and the low-order element of composite field $GF((2^m)^2)$ of operand A are inputted sequentially to ground field $GF(2^m)$ multipliers 301, 302 to generate a plurality of $GF(2^m)$ partial products, such as, $a_0b_0$, $a_1b_1$, $a_1b_0$, and $a_0b_1$. The plurality of $GF(2^m)$ partial products generates a high-order element and a low-order element of the $GF((2^m)^2)$ product through constant multiplier 311 and a plurality of $GF(2^m)$ adders 321-323. The high-order element and the low-order element of the product are then mapped back to $GF(2^n)$ to accomplish the $GF(2^n)$ multiplication.

The GF multiplier architecture may further include an input operand mapper for mapping each operand of $GF(2^n)$ to the $GF((2^m)^2)$ composite filed to obtain two corresponding $GF(2^m)$ elements, i.e., the high-order element and the low-order element of the composite field of the operand.

The following describes the operation of the components of the GF multiplier to execute the $GF(2^n)$ multiplication.

The following description of the $GF(2^n)$ multiplication execution refers to FIG. 3. The two input operands, A and B, to perform the $GF(2^n)$ multiplication will pass a mapping computation 333a for mapping operand A and operands B from $GF(2^n)$ into composite field $GF((2^m)^2)$ to obtain elements of composite field. The high-order element and low-order element of operand B, after mapping, are depicted as InputB_CF_H (i.e., $b_1$) and InputB_CF_L (i.e., $b_0$), respectively. The sequential input sequence of the high-order element and the low-order element of operand A after mapping is depicted as InputA_CF sequence. High-order element InputB_CF_H and low-order element InputB_CF L of operand B after mapping are inputted in parallel to ground field $GF(2^m)$ multipliers 301, 302; while two composite field elements of InputA_CF (i.e., $a_1$ and $a_0$) are inputted sequentially to ground field $GF(2^m)$ multipliers 301, 302.

Assume that the initial values in registers 341, 342 are zero, and the sequence of InputA_CF through sequencer 333b is first $a_1$ then $a_0$, the execution flow of the operation is to input $a_1$, through ground field $GF(2^m)$ multipliers 301, 302 to compute $a_1 b_1$ and $a_1 b_0$. Then, output $a_1 b_1$ of ground field $GF(2^m)$ multiplier 301 is multiplied by a constant $r_0$ by constant multiplier 311 to obtain $a_1 b_1 r_0$, which is stored to register 341 by control signal control-2. In other words, register 341 contains the value $a_1 b_1 r_0$ at this point. On the other hand, $a_1 b_0$ and $a_1 b_1$, after $GF(2^n)$ element addition XOR, is stored to register 342 by control signal control-1. In other words, register 342 contains the value $a_1 b_0 + a_1 b_1$ at this point. Then, $a_0$ is inputted to composite field $GF((2^m)^2)$ multipliers 301, 302 to obtain $a_0 b_0$ and $a_0 b_1$, respectively.

Then, control signal control-2 is used to make $a_0 b_0$ and a previous value of register 341 (i.e., $a_1 b_1 r_0$) to pass $GF(2^n)$ element addition XOR to obtain $a_0 b_0 + a_1 b_1 r_0$. Control signal control-1 selects $a_0 b_1$ and a previous value of register 342 to pass through $GF(2^n)$ element addition XOR to obtain $a_1 b_0 + a_1 b_1 + a_0 b_1$. Finally, the contents of registers 341, 342 are mapped back to $GF(2^n)$ field, marked as 350, to complete a $GF(2^n)$ multiplication.

Figure 4:
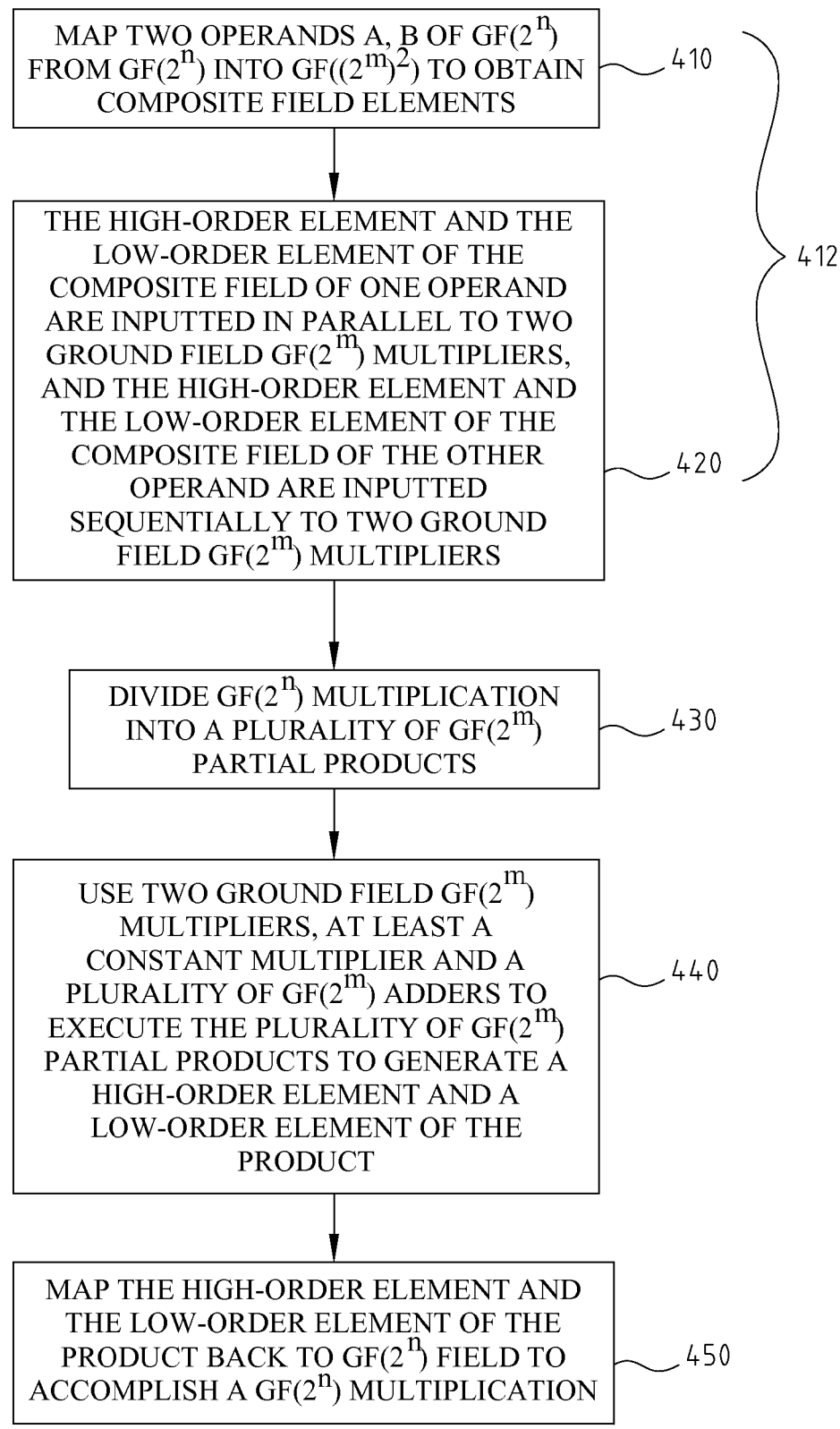
FIG. 4 shows an exemplary flowchart illustrating a method for performing a semi-sequential GF multiplication, consistent with certain disclosed embodiments of the present invention.

FIG. 4 shows an exemplary flowchart illustrating a method for performing a semi-sequential GF multiplication, consistent with certain disclosed embodiments of the present invention. Referring to the exemplary flowchart in FIG. 4, at first, two operands A, B of $GF(2^n)$ are mapped from $GF(2^n)$ to $GF((2^m)^2)$ to obtain composite field elements, as shown in step 410. In step 420, for one operand, such as B, the high-order element and the low-order element of composite field are inputted in parallel to two ground field $GF(2^m)$ multipliers, and for the other operand, such as A, the high-order element and the low-order element of composite field are inputted sequentially to two ground field $GF(2^m)$ multipliers.

In other words, in the $GF(2^n)$ multiplication execution method of the disclosed, the input of the two operands are semi-sequential 412, i.e. including steps 410, 420. In step 420, the sequential input sequence is not limited to either inputting high-order element first or low-order element first. Either way, both are within the scope of the semi-sequential input method of the present invention.

After two operands are inputted, $GF(2^n)$ multiplication is divided into a plurality of $GF(2^m)$ partial products, as shown in step 430. Step 440 is to use two ground field $GF(2^m)$ multipliers, at least a constant multiplier and a plurality of $GF(2^m)$ adders to execute the plurality of $GF(2^m)$ partial products and generate a high-order element and a low-order element of the product.

Finally, the high-order element and the low-order element of the product are mapped back to $GF(2^n)$ field to complete a $GF(2^n)$ multiplication, as shown in step 450.

$GF(2^m)$ multipliers may be implemented with the Mastrivito multiplier architecture. Assume that the m-tuple of two GF(2m) elements are represented as $A[m-1:0]=[a_0\ a_1\ \cdots\ a_{m-1}]$, $B[m-1:0]=[b_0\ b_1\ \cdots\ b_{m-1}]$, respectively, then the computation $C=A[m-1:0] \times B[m-1:0]$ of Mastrivito multiplier may be represented as:

$$\underbrace{\begin{bmatrix} c_0 \\ c_1 \\ \vdots \\ c_{m-1} \end{bmatrix}}_{C} = \underbrace{\begin{bmatrix} z_{0,0} & z_{0,1} & \cdots & z_{0,m-1} \\ z_{1,0} & z_{1,1} & \cdots & z_{1,m-1} \\ \vdots & \vdots & \ddots & \vdots \\ z_{m-1,0} & z_{m-1,1} & \cdots & z_{m-1,m-1} \end{bmatrix}}_{Z_B} \underbrace{\begin{bmatrix} a_0 \\ a_1 \\ \vdots \\ a_{m-1} \end{bmatrix}}_{A} \quad (1)$$

where $Z_B$ is called product matrix, and the value of the matrix is $z_{i,j}=f_{i,j}(b_0, b_1, \ldots, b_{m-1})$.

$$f_{i,j} = \begin{cases} b_i & j=0 & i=0,\ldots,m-1 \\ u(i-j)b_{i-j} + \sum_{t=0}^{j-1} q_{j-1-t,i} b_{n-l-t} & j=1,\ldots,m-1 & i=0,\ldots,m-1 \end{cases} \quad (2)$$

$$\text{and } u(\mu) = \begin{cases} 1 & \mu \geq 0 \\ 0 & \mu < 0. \end{cases}$$

Figure 5:
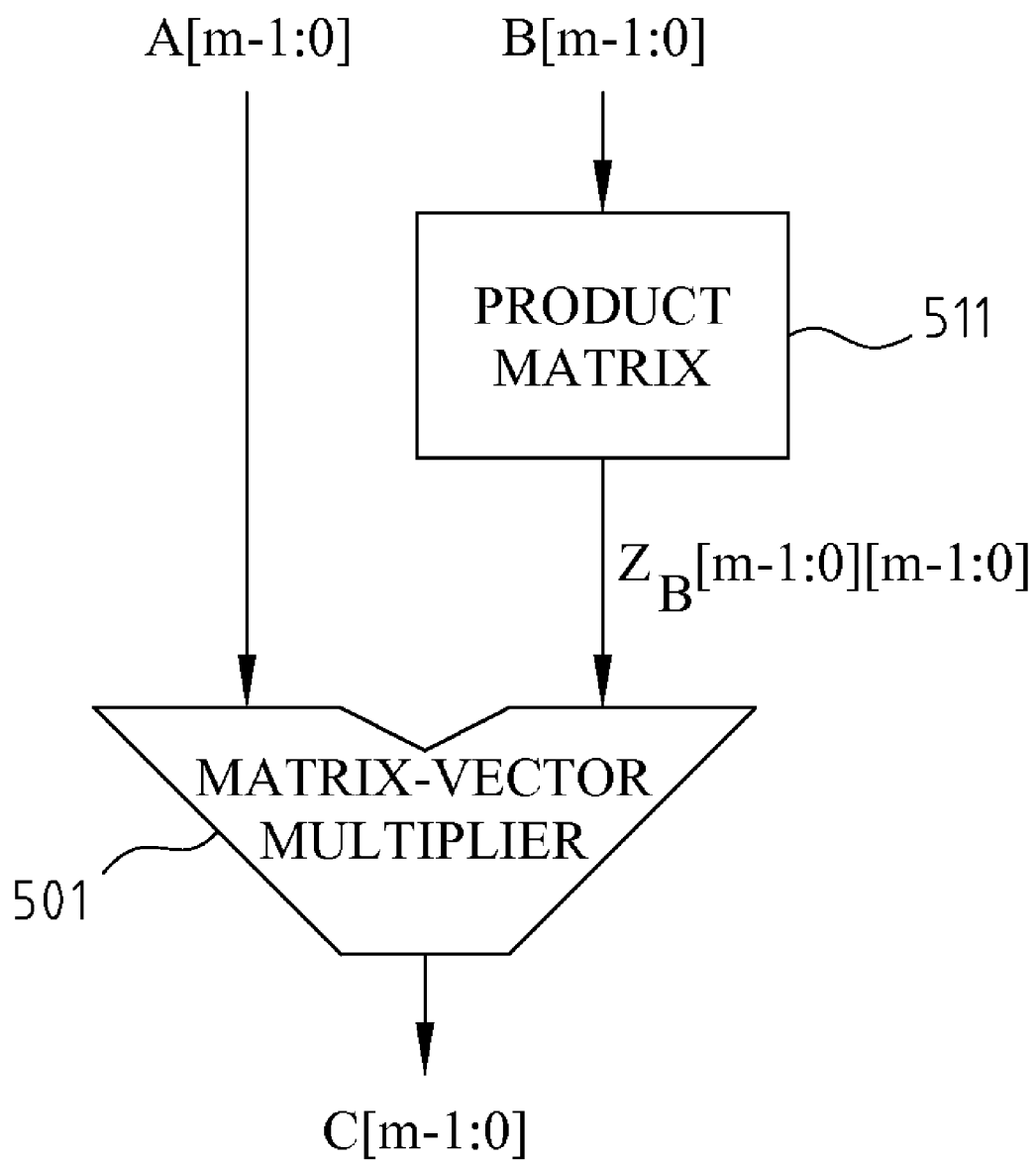
FIG. 5 shows an exemplary schematic view of using Mastrivito multiplier hardware to realize an m-bit GF multiplication, consistent with certain disclosed embodiments of the present invention.

FIG. 5 shows an exemplary schematic view of using Mastrivito multiplier hardware to realize an m-bit GF multiplication, consistent with certain disclosed embodiments of the present invention. In the exemplary hardware implementation of FIG. 5, matrix-vector multiplier 501 is to execute the computation of equation (1) and product matrix 511 is to execute the computation of equation (2). An m×m product matrix $Z_B$ may be obtained after function f mapping m-bit operand B. Then, the value of the matrix is multiplied by a matrix-vector multiplier, i.e., computation of equation (1), to complete an m-bit GF multiplication.

In other words, one feature of the Mastrivito multiplier architecture is to divide the $GF(2^m)$ multiplication into two steps to complete an m-bit GF multiplication. The first step is to convert one operand B from m-bit vector into an m×m product matrix, and the second step is to perform matrix-vector multiplication with the matrix and the other operand A to obtain the final product.

In the two-step architecture, when one operand is a low-frequency variable, as shown in FIG. 6, each $B_i$ operand will be multiplied with a plurality of $A_i$ operands. In this manner, a pipeline design may be used to perform matrix conversion on low frequency variable B to obtain an m×m product matrix $Z_B$ and store the product matrix. Because A has a higher frequency of change than B, all the A×B operations before the change of B only require to execute equation (1) without equation (2).

Figure 7:
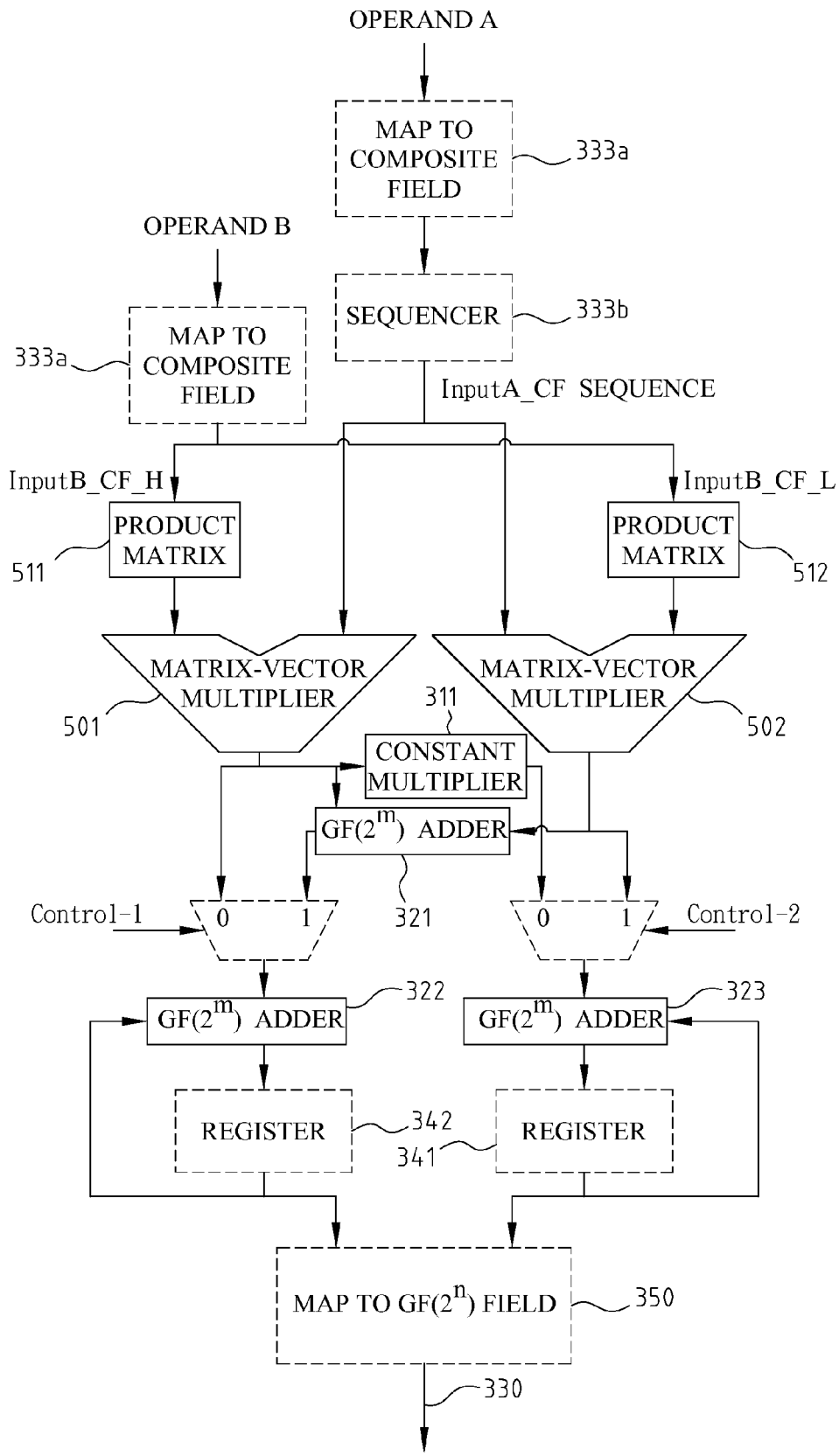
FIG. 7 shows an exemplary schematic view illustrating an embodiment of realizing the two ground field $GF(2^m)$ multipliers of FIG. 3 by using two Mastrivito multipliers, consistent with certain disclosed embodiments of the present invention.

FIG. 7 shows an exemplary schematic view illustrating an embodiment of realizing the two ground field $GF(2^m)$ multipliers of FIG. 3 by using two Mastrivito multipliers, consistent with certain disclosed embodiments of the present invention. Ground field $GF(2^m)$ multiplier 301 is realized by matrix-vector multiplier 501 and product matrix 511, and ground field $GF(2^m)$ multiplier 302 is realized by matrix-vector multiplier 502 and product matrix 512. As shown in FIG. 7, operand B will pass two operations of conversion before entering matrix-vector multiplier. One conversion is mapping to composite filed, and the other conversion is the product matrix conversion required by the Mastrivito architecture. The operation of mapping to composite field and the product matrix may be integrated into a single matrix conversion, shown as matrix conversion 821, 822 of FIG. 8, for converting the high-order element and low-order element of operand B, respectively.

The above hardware realization of GF multiplier and related execution method may be applied to encryption/decryption system based on GCM-AES as the default encryption/decryption computation. Because the GF multipliers may be reused with computation units, the GCM-AES hardware cost may be effectively reduced.

The following exemplar uses a $GF((2^4)^2)$ composite field realizing a $GF(2^8)$ multiplier, i.e., n=8, m=4, to explain the disclosed exemplary semi-sequential GF multiplier and executed method according to the present invention.

Assume that primitive polynomial g(x) forming $GF(2^8)$ is $1+x^2+x^3+x^4+x^8$, primitive polynomial p(x) forming $GF(2^4)$ is $1+x+x^4$, and the primitive polynomial for generating $GF((2^4)^2)$ is $x^2+x+\alpha^{14}$. According to Christof Paar theory, the matrix mapping from $GF(2^8)$ to $GF((2^4)^2)$ is:

$$\begin{bmatrix} 0 & 0 & 1 & 0 & 0 & 0 & 0 & 0 \\ 0 & 1 & 1 & 0 & 0 & 1 & 0 & 0 \\ 0 & 0 & 0 & 1 & 1 & 0 & 1 & 0 \\ 1 & 0 & 0 & 1 & 0 & 0 & 0 & 0 \\ 0 & 0 & 1 & 0 & 0 & 1 & 1 & 0 \\ 1 & 0 & 0 & 1 & 1 & 0 & 1 & 0 \\ 0 & 0 & 1 & 0 & 0 & 0 & 1 & 0 \\ 0 & 0 & 0 & 0 & 1 & 0 & 1 & 1 \end{bmatrix}$$

Figure 8:
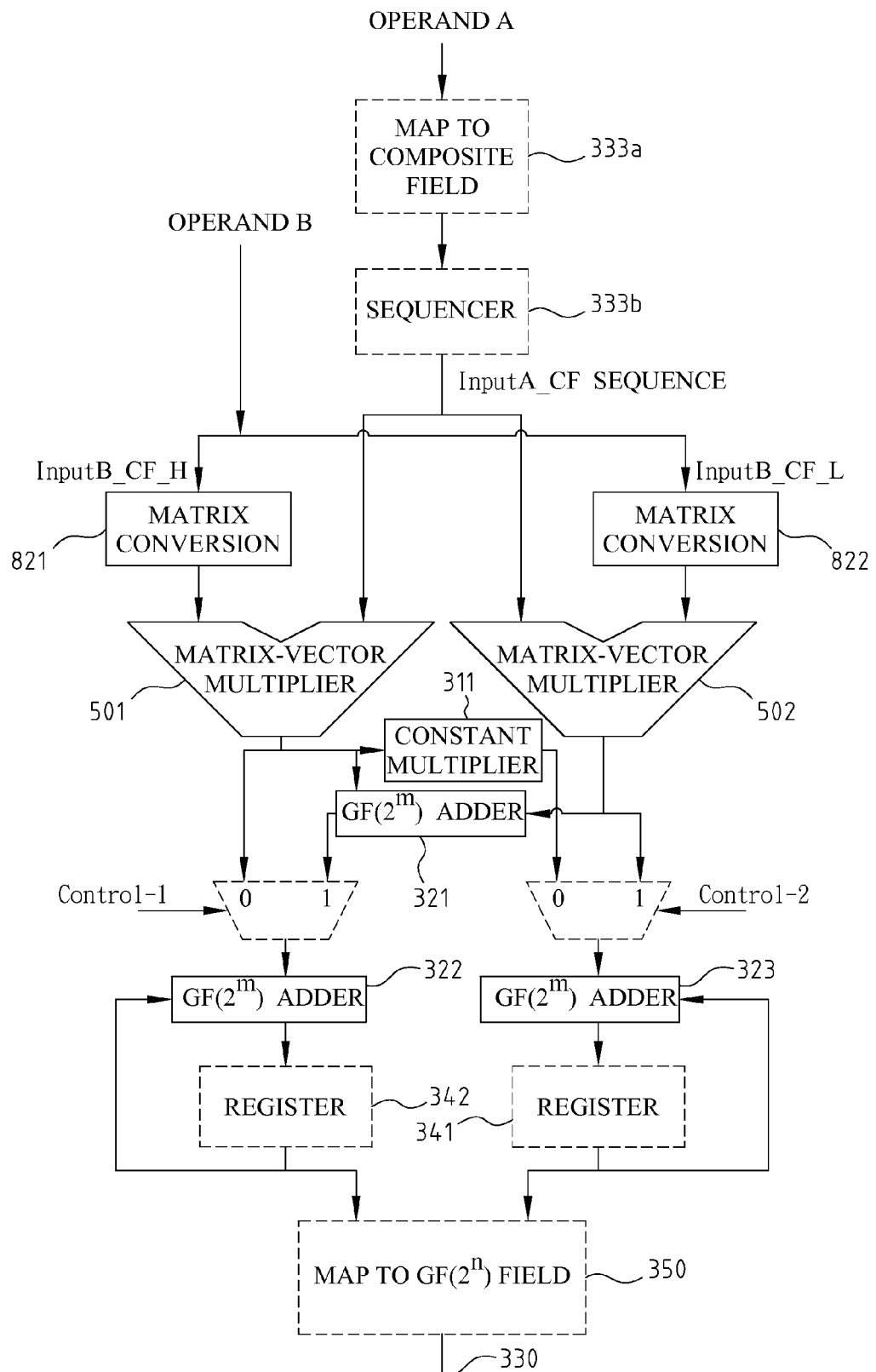
FIG. 8 shows an exemplary schematic view of a GF multiplier with integrating mapping to composite field computation and product matrix into a single matrix conversion, consistent with certain disclosed embodiments of the present invention.

Assume that operand B belongs to $GF(2^8)$, with coefficients $[b_0\ b_1\ b_2\ b_3\ b_4\ b_5\ b_6\ b_8]^T$. After conversion, the following $$\begin{bmatrix} 0 & 0 & 1 & 0 & 0 & 0 & 0 & 0 \\ 0 & 1 & 1 & 0 & 0 & 1 & 0 & 0 \\ 0 & 0 & 0 & 1 & 1 & 0 & 1 & 0 \\ 1 & 0 & 0 & 1 & 0 & 0 & 0 & 0 \\ 0 & 0 & 1 & 0 & 0 & 1 & 1 & 0 \\ 1 & 0 & 0 & 1 & 1 & 0 & 1 & 0 \\ 0 & 0 & 1 & 0 & 0 & 0 & 1 & 0 \\ 0 & 0 & 0 & 0 & 1 & 0 & 1 & 1 \end{bmatrix} \begin{bmatrix} b_0 \\ b_1 \\ b_2 \\ b_3 \\ b_4 \\ b_5 \\ b_6 \\ b_7 \end{bmatrix} = \begin{bmatrix} b_2 \\ b_1+b_2+b_5 \\ b_3+b_4+b_6 \\ b_0+b_3 \\ b_2+b_5+b_6 \\ b_0+b_3+b_4+b_6 \\ b_2+b_6 \\ b_4+b_6+b_7 \end{bmatrix} = \begin{bmatrix} b'_{1,0} \\ b'_{1,1} \\ b'_{1,2} \\ b'_{1,3} \\ b'_{h,0} \\ b'_{h,1} \\ b'_{h,2} \\ b'_{h,3} \end{bmatrix}$$

may be obtained, i.e., the operation of mapping into composite field in FIG. 3, FIG. 7 and FIG. 8.

Mastrivito multiplier $GF(2^4)$ product matrix from equation (2) and $1+x+x^4$, the product matrix of low-order element and high-order element are as follow:

$$\begin{bmatrix} b'_{1,0} & b'_{1,3} & b'_{1,2} & b'_{1,1} \\ b'_{1,1} & b'_{1,0}+b'_{1,3} & b'_{1,2}+b'_{1,3} & b'_{1,1}+b'_{1,2} \\ b'_{1,2} & b'_{1,1} & b'_{1,0}+b'_{1,3} & b'_{1,2}+b'_{1,3} \\ b'_{1,3} & b'_{1,2} & b'_{1,1} & b'_{1,0}+b'_{1,3} \end{bmatrix} \text{ and}$$

$$\begin{bmatrix} b'_{h,0} & b'_{h,3} & b'_{h,2} & b'_{h,1} \\ b'_{h,1} & b'_{h,0}+b'_{h,3} & b'_{h,2}+b'_{h,3} & b'_{h,1}+b'_{h,2} \\ b'_{h,2} & b'_{h,1} & b'_{h,0}+b'_{h,3} & b'_{h,2}+b'_{h,3} \\ b'_{h,3} & b'_{h,2} & b'_{h,1} & b'_{h,0}+b'_{h,3} \end{bmatrix}$$

This is the product matrix in FIG. 5 and FIG. 7.

As shown in FIG. 8, the operation of mapping into composite field and the product matrix may be integrated into a single matrix conversion, i.e., substituting $b'_{1,i}$ and $b'_{h,i}$ into product matrix. Therefore, for low-order element of operand B, the integrated matrix conversion is:

$$\begin{bmatrix} b_2 & b_0+b_3 & b_3+b_4+b_6 & b_1+b_2+b_5 \\ b_1+b_2+b_5 & b_0+b_2+b_3 & b_0+b_4+b_6 & b_1+b_2+b_3+b_4+b_5+b_6 \\ b_3+b_4+b_6 & b_1+b_2+b_5 & b_0+b_2+b_3 & b_0+b_4+b_6 \\ b_0+b_3 & b_3+b_4+b_6 & b_1+b_2+b_5 & b_0+b_2+b_3 \end{bmatrix}$$

and for low-order element of operand B, the integrated matrix conversion is $$\begin{bmatrix} b_2+b_5+b_6 & b_4+b_6+b_7 & b_2+b_6 & b_0+b_3+b_4+b_6 \\ b_0+b_3+b_4+b_6 & b_2+b_4+b_5+b_7 & b_2+b_4+b_7 & b_0+b_2+b_3+b_4 \\ b_2+b_6 & b_0+b_3+b_4+b_6 & b_2+b_4+b_5+b_7 & b_2+b_4+b_7 \\ b_4+b_6+b_7 & b_2+b_6 & b_0+b_3+b_4+b_6 & b_2+b_4+b_5+b_7 \end{bmatrix}$$

The two matrixes are the integrated matrix conversion in FIG. 8 for converting operand B.

In summary, the disclosed exemplary embodiments of the present invention uses the GF composite field theory to explore the condition when one operand is a low frequency variable by using $GF(2^m)$ finite field multipliers to realize $GF(2^n)$ finite field multiplication, n=2m. As the computation unit may be re-used, the present invention provides a semi-sequential GF multiplier architecture and the method for performing the same. The disclosed exemplary embodiments of the present invention, when applied to encryption/decryption system based on GCM-AES as the default encryption/decryption computation, may effectively reduce the GCM-AES hardware cost.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus having multiplier, adders and registers for computing semi-sequential Galois Field (GF) $GF(2^n)$ multiplication with two $GF(2^n)$ operands, n being a positive even integer, comprising:

two single ground field $GF(2^m)$ multipliers, for respectively inputting a high-order element and a low-order element of the composite field of one of said two operands in parallel and inputting a high-order element and a low-order element of the composite field of the other operand of said two operands sequentially, and generating a plurality of $GF(2^m)$ partial products, n=2m;

at least a constant multiplier, connected to said the single ground field $GF(2^m)$ multiplier inputting the high-order elements of said two operands; and a plurality of single $GF(2^m)$ adders;

wherein one of said two operands is mapped from $GF(2^n)$ into $GF(2^m)$ through an operation of mapping into composite field to send the high-order element and the low-order element of the composite field of the one operand to the two single ground field $GF(2^m)$ multipliers, the high-order element and a low-order element of the composite field of the other operand pass through a respective single matrix conversion and then are send to the two single ground field $GF(2^m)$ multipliers, said plurality of $GF(2^m)$ partial products pass through said constant multiplier and said plurality of single $GF(2^m)$ adders to obtain a high-order element and a low-order element of a $GF((2^m)^2)$ product, and said high-order element and said low-order element of said $GF((2^m)^2)$ product are mapped back to $GF(2^n)$ field to accomplish said $GF(2^n)$ multiplication.

2. The apparatus as claimed in claim 1, wherein each of said two single ground field $GF(2^m)$ multipliers is realized with a Mastrivito multiplier architecture.

3. The apparatus as claimed in claim 2, wherein said Mastrivito multiplier architecture is realized with an architecture of matrix-vector multiplier and a product matrix.

4. The apparatus as claimed in claim 1, wherein said high-order element and said low-order element of said $GF((2^m)^2)$ product are stored temporarily in two registers respectively.

5. The apparatus as claimed in claim 1, wherein said single matrix conversion is an integration of an operation of mapping to composite field and a product matrix.

6. The apparatus as claimed in claim 1, wherein two control signals control the storage of said high-order element and said low-order element of said $GF((2^m)^2)$ product temporarily in two registers respectively.

\* \* \* \* \*